United States Patent [19]

Oshima

[11] 4,447,268

[45] May 8, 1984

[54] IVORY LIKE COMPOSITION PLATE FOR COVERING A WOODEN BASE AND METHOD FOR PRODUCING SAME

[76] Inventor: Yutaka Oshima, 10-1, Nakazawa-cho, Hamamatsu-shi, Shizuoka-ken, Japan

[21] Appl. No.: 501,968

[22] Filed: Jun. 10, 1983

Related U.S. Application Data

[63] Continuation of Ser. No. 296,483, Aug. 26, 1981, abandoned.

[30] Foreign Application Priority Data

Sep. 2, 1980 [JP] Japan .................................. 55-121663
Dec. 2, 1980 [JP] Japan .................................. 55-172956

[51] Int. Cl.$^3$ ............................................. C08L 89/00
[52] U.S. Cl. ...................................... 106/148; 106/137
[58] Field of Search ................................. 106/136, 148

[56] References Cited

U.S. PATENT DOCUMENTS

| | | | |
|---|---|---|---|
| 444,775 | 1/1891 | De Pont et al. ..................... | 106/137 |
| 1,320,666 | 11/1919 | Bartels ................................. | 106/148 |
| 1,758,500 | 5/1930 | Christmas et al. .................. | 106/148 |

FOREIGN PATENT DOCUMENTS

| | | | |
|---|---|---|---|
| 57-45592 | 3/1982 | Japan ................................. | 106/148 |
| 530790 | 12/1940 | United Kingdom ............... | 106/148 |

*Primary Examiner*—Theodore Morris

[57] ABSTRACT

Artificial ivorylike material having ideal properties suited, just like natural ivory, for keys of musical instruments is produced by dispersing either hydrated or non-hydrated inorganic filler in casein matrix with later-staged hardening by formalin.

11 Claims, No Drawings

IVORYLIKE COMPOSITION PLATE FOR COVERING A WOODEN BASE AND METHOD FOR PRODUCING SAME

This is a continuation of application Ser. No. 296,483 filed Aug. 26, 1981, now abandoned.

BACKGROUND OF THE INVENTION

The present invention relates to an ivorylike composition plate for covering a wooden base and method for producing same, and more particularly relates to artificial material for covering a wooden base of a key of musical instruments having properties very close to those of natural ivory and its production.

Ivory has been highly appreciated by experts in the field of keyboard musical instruments such as pianos, organs and accordions as a material for composing at least surface sections of keys. Such preference for ivory is believed to be caused by, aside from the fact that ivory is a material well used for high class art objects, its ideal properties which suffice following requirements for materials to be used for production of keys for musical instruments.

(a) The material should have moderate moisture absorbability so that the key should well absorb sweat on the fingers of players in order to prevent undesirable finger slippage on the key during performance.

(b) The material should have moderate surface smoothness with moderate frictional resistance since these factors have a subtle influence on key touch.

(c) The material should have excellent appearance, i.e. high whiteness accompanied with high resistance against contamination.

(d) The material should have moderate hardness for better key touch and prevention of frictional abrasion even after long use.

(e) The material should have moderate workability for easy shaping into keys.

Poor supply of natural ivory having such ideal properties, however, cannot well meet the demand in the field of the musical instrument. In particular, African countries, which have long been a major and rich supply source of ivory, have started to ban or at least to impose severe restriction on collection of ivory in order to protect natural animals such as elephants.

In view of such a situation, synthetic resins have been widely used as a material for keys of musical instrument in recent years since they have no problem in constant supply. Synthetic resin keys, however, still have several drawbacks despite their beautiful appearance and flexible workability. That is, excessive smoothness of synthetic resin often causes undesirable finger slippage on keys, poor moisture absorbability of synthetic resin leads to sweat problem which may cause increased danger of finger slippage on keys, and relatively low hardness of synthetic resin eventuates in significant frictional abrasion of keys.

It is well known to produce so-called casein plastics by kneading and mixing casein with water after addition of any pigments or dyes, and hardening the mixture through treatment with formalin after molding. However, this sort of casein plastics also has some drawbacks when used for keys of musical instruments. Casein plastics lack in comfortable key touch, dimensional stability in dry and wet states, hardness, heat conductivity and massive impression of natural ivory.

SUMMARY OF THE INVENTION

It is one object of the present invention to provide artificial material for keys of musical instruments which has excellent properties very close to natural ivory conventionally used for keys of musical instruments.

It is another object of the present invention to provide ideal artificial material used for keys of musical instrument which assures rich constant supply freely controllable in accordance with the size of demand.

In accordance with one aspect of the present invention, hydrated inorganic filler is dispersed in casein resin matrix hardened with formalin.

In production, powdery casein and hydrated inorganic filler are kneaded and mixed with water and the mixture is hardened through impregnation with formalin after shaping.

In accordance with the other aspect of the present invention, non-hydrated inorganic filler is dispersed in casein resin matrix hardened with formalin.

In production, powdery casein and non-hydrated inorganic filler are kneaded and mixed with water and the mixing is hardened through impregnation with formalin after shaping.

DESCRIPTION OF THE PREFERRED EMBODIMENTS

The present invention evolves from a basic concept of adding hydrated or non-hydrated inorganic filler to casein resin matrix in order to remove the above-described drawbacks of the conventional casein plastics whilst preserving high moisture absorbability and excellent affinity to human skin which are characteristics of casein plastics.

In the following description, "percentage" and "part" of ingredients both generally refer to ratio in weight.

The casein used for this invention should preferably take the form of grains comminuted to a grain size of 100 mesh or smaller. Any grain sizes larger than this value tend to cause uneven mixing with the inorganic filler. Casein is a sort of phosphoprotein, i.e. a conjugated protein which is obtained by mixing proteins of similar types. Its molecular weight is in a range from 75,000 to 375,000 and it is contained by about 3% in cow's milk and about 1% in human milk. Casein coagulated mainly from cow's milk by enzyme rennin is called rennet casein whereas casein coagulated by acid is called acid casein. For the purposes of the present invention, it is expedient to use rennet casein having a huge molecular construction with a lot of folded branches.

The hydrated inorganic filler for the present invention of the first aspect is most preferably taken from a group including alumina trihydrate ($Al(OH)_3$), other alumina hydrates, magnesium hydroxide, basic magnesium carbonate, hydrated aluminium silicate, magnesium silicate and hydrated silicic acid. These compounds bring about better result in the later shaping of the mixture. Calcium compounds such as calcium sulfate hydrate and hydrated calcium silicate may also be used although result in the shaping is somewhat worse.

These hydrated inorganic fillers originally contain crystal water in themselves, or become to contain crystal water after hydration with water. Hydration of the inorganic filler enables addition of a great deal of filler to casein which was not the case with the conventional casein plastics. When such a great deal of filler is added to casein, correspondingly increased amount of water has to be added for kneading and mixing, which often causes undesirable phase separation. The hydrophilic property of the inorganic filler, however, leads to high affinity of the filler to the casein and eventuates in their ideal mixing in spite of the large addition of the inorganic filler. Such high affinity to casein is believed to result from hydrogen bonding between oxigen atoms or hydroxyl groups of the filler and amino groups of the casein.

Further, the hydrated state of the filler provides the product with ideal frictional resistance necessary for keys of musical instruments, and with high hydrophilic property regardless of atmospheric humidity. Even small amount of addition is believed to enhance heat conductivity of the product, i.e. cool touch on player's fingers during performance.

Such hydrated inorganic filler is added by 10 to 200 parts, more preferably 25 to 75 parts, with respect to 100 parts of casein. Any amount that falls short of 10 parts would not assure the expected effect of addition. Whereas any amount exceeding 200 parts would disenable smooth shaping and, as a consequence, greatly lowers mechanical properties of the product, mainly stiffness and strength.

The content ratio of the hydrated inorganic filler in the end product should preferably be in a range from 14.3 to 69.5%, more preferably from 25.0 to 47.0%.

In addition to the above-described ingredients, any pigment such as titanium oxide or acid dye may be added by 1 to 10 parts with respect to 100 parts of casein for the purpose of colour tone adjustment. Further, in order to raise the hardness of the shaped block, non-hydrated inorganic filler such as silicon dioxide, alumina, barium sulfate, calcium phosphate and calcium carbonate may be added by 1 to 50 parts, more preferably 5 to 20 parts.

The non-hydrated inorganic filler for the present invention of the second aspect is preferably taken from a group including silica oxide, alumina, barium carbonate, calcium sulfate, magnesium oxide, titanium oxide, calcium phosphate and calcium carbonate.

Such non-hydrated inorganic filler is added by 10 to 200 parts, more preferably 50 to 100 parts with respect to 100 parts of casein. Any amount that falls short of 10 parts would not assure the expected effect of addition. Whereas any amount exceeding 200 parts would disenable smooth shaping and, as a consequence, greatly lowers mechanical properties of the product, mainly stiffness and strength.

The content ratio of the non-hydrated inorganic filler in the end product should preferably be in a range from 14.3 to 69.5%, more preferably from 37.9 to 53.8%.

In addition to the above-described ingredients, any pigment such as titanium oxide and white zinc may be added by 1 to 10 parts with respect to 100 parts of casein for the purpose of colour tone adjustment.

In production of the ivorylike material in accordance with the present invention, the above-described ingredients are kneaded and mixed with, for example, 10 to 40 part of water with respect to 100 parts of casein in a mixing and grinding machine. Thereafter, the mixture is left for 5 to 24 hours under room temperature in order to promote swelling of casein for better molding.

Shaping of the mixture is usually carried out by extrusion, mechanical press after rolling or solely mechanical press. Shaping by extrusion is carried out with a pressure from about 100 to 200 kg/cm$^2$. Temperature in the extruder is adjusted so that the temperature rises gradually from the end of the cylinder to the die head over the range of about 20° to 100° C. Shaping by mechanical press is carried out with a pressure of 100 to 200 kg/cm$^2$ and at a temperature from 85° to 95° C.

Next, the shaped block is impregnated with formalin of 3 to 10% concentration at a temperature close to the room temperature for hardening of casein. Length of the impregnation period varies depending on the dimension of the shaped block. When the shaped block is given in a plate form, the period is about 6 days for 3 mm thickness, about 16 days for 5 mm thickness and about 50 days for 10 mm thickness.

After hardening, the hardened block is heated for solidification. If required, proper machining such as cutting or grinding is applied to the solidified block in order to obtain the ivorylike composition plate in accordance with the present invention. The ivorylike material may solely form keys or combined with any other material to form keys. In the latter case, the ivorylike composition plate usually covers the surface of a wooden base which is touched by player's fingers. It is employable to colour the ivorylike composition plate in black in order to form black keys. However, since the ivorylike composition plate in accordance with the present invention is highly rich in whitness, it is rather advantageous to use the material for white keys.

In accordance with the present invention, ivorylike composition plate having properties very close to those of natural ivory is obtained by kneading and mixing powdery casein and hydrated or non-hydrated inorganic filler with water, and hardening the mixture after shaping through treatment with formalin. The ivorylike composition plate so produced is accompanied with the following excellent properties.

(a) The ivorylike composition plate presents about 10% moisture absorption when immersed in water of 25° C. for 24 hours. Such high rate moisture absorption allows keys made of the ivorylike composition plate to well absorb sweat on player's fingers thereby preventing undesirable finger slippage on the keys during performance.

(b) Keys made of the ivorylike material have comfortable touch, massive impression and moderate frictional resistance which correspond to those of natural ivory keys.

(c) The ivorylike composition plate can be freely coloured as desired either during production or after production.

(d) The ivorylike composition plate presents excellent dimensional stability in either dry or wet state, and enhanced hardness.

EXAMPLES

Example 1

TABLE 1

| Ingredients | Content in parts |
| --- | --- |
| Rennet casein (grain size 150~250 mesh) | 100 |
| Alumina trihydrate (Al(OH)$_3$) | 50 |
| titanium oxide | 5 |
| Water | 30 |

Ingredients shown in Table 1 were kneaded and mixed sufficiently in a crush mixer. Thereafter the mixture was left for 12 hours at the room temperature for swelling of casein. Next the mixture was placed in a metallic mold for shaping by hot press with 150 kg/cm$^2$ pressure and at 95° C. Temperature. The shaped composition plate was then hardened by treatment with 5% formalin solution and a shaped composition plate of uniform ivory colour and of 50×200×5 mm dimension was obtained. It was confirmed by measurement that the ivorylike composition plate so produced was accompanied with the following properties.

| | |
|---|---|
| Specific gravity | 1.34 |
| Rockwell hardness (M-scale) | Hr (M) 70~80 (20° C., 60%) |
| | Hr (M) 40~50 (after 24 hours immersion in water of 25° C.) |
| Moisture absorption | 6~10% (after 24 hours immersion in water of 25° C.) |
| Bending strength | 7~8 kg/mm$^2$ |
| Bending elasticity | 500~600 kg/mm$^2$ |
| Heat conductivity | 0.5 Kcal/m.hr. °C. |
| Static coefficient of friction | dry state 0.2~0.25 (23° C., 35%) |
| | wet state 0.95~1.00 (deer skin was used) |
| Compressive strength | 30~40 kg/mm$^2$ |

For comparison, a like shaped block with the composition of Table 1 but excluding aluminium hydroxide was prepared in the same way and its properties were measured as shown below.

| | |
|---|---|
| Specific gravity | 1.34 |
| Rockwell hardness | Hr (M) 99 (20° C., 60%) |
| | Hr (M) 16 (after immersion in water of 25° C.) |
| Bending strength | 7~8 kg/mm$^2$ |
| Bending elasticity | 500~600 kg/mm$^2$ |
| Heat conductivity | 0.18 Kcal/m.hr. °C. |
| Static coefficient of friction | dry state 0.2~0.25 |
| | wet state 0.80~0.90 (23° C., 35%) (deer skin was used) |
| Compressive strength | 19~30 kg/mm$^2$ |
| Tensile strength | 7 kg/mm$^2$ |

These data clearly indicate that addition of hydrated inorganic filler, i.e. alumina trihydrate, assures significant improvement in properties of the product.

Example 2

As shown in Table 2, a wide variety of hydrated inorganic fillers were separately added to casein and obtained mixtures were processed just as in Example 1. Properties of the products were measured also in the same way and are shown in Table 3.

TABLE 2

| Sample No. | Filler | Chemical composition | Parts Per 100 parts of casein |
|---|---|---|---|
| 1 | Calcium sulfate | $CaSO_4.2H_2O$ | 50 |
| 2 | Hydrated silicic acid | $SiO_2.nH_2O$ | 75 |
| 3 | Magnesium hydroxide | $Mg(OH)_2$ | 50 |
| 4 | Hydrated aluminium silicate | $Al_2O_3.2SiO_2.nH_2O$ | 50 |
| 5 | Hydrated calcium silicate | $C_aO.XSiO_2.nH_2O$ | 75 |
| 6 | Calcium hydroxide | $Ca(OH)_2$ | 75 |

TABLE 3

| Sample No. | Specific gravity | Hardness Hr V | Moisture absorption % | Heat conductivity Kcal/m.hr. °C. | Static coefficient of friction dry | Static coefficient of friction wet |
|---|---|---|---|---|---|---|
| 1 | 1.56 | 65~70 | 6~8 | 0.40 | 0.25~0.30 | 0.85~0.95 |
| 2 | 1.58 | 70~80 | 6~7 | 0.50 | 0.20~0.25 | 0.80~0.90 |
| 3 | 1.57 | 70~75 | 6~8 | 0.45 | 0.20~0.25 | 0.80~1.00 |
| 4 | 1.59 | 70~80 | 7~8 | 0.45 | 0.20~0.25 | 0.80~0.90 |
| 5 | 1.63 | 80~90 | 6~7 | 0.50 | 0.25~0.35 | 0.90~1.00 |
| 6 | 1.62 | 80~90 | 6~7 | 0.50 | 0.25~0.30 | 0.85~0.95 |

These data clearly indicate that addition of any kinds of hydrated inorganic fillers almost equally assures significant improvement in properties of the product.

Example 3

This Example was directed to addition of non-hydrated inorganic filler in accordance with the second aspect of the present invention. A mixture having the composition shown in Table 4 was prepared by means of a crush mixer. Then the mixture was left for 12 hours at the room temperature for swelling of the casein.

TABLE 4

| Ingredients | parts |
|---|---|
| Rennet casein of 150~250 mesh grain size | 100 |
| Silicon oxide | 75 |
| Water | 30 |

The mixture was next placed in a metallic mold for heat press at 95° C. temperature and 150 kg/cm$^2$ pressure for shaping. The shaped block was impregnated with 5% formalin solution for hardening and an ivorylike shaped block of 50×200×5 mm was obtained. It was confined by measurement that the product was accompanied with the following properties.

| | |
|---|---|
| Specific gravity | 1.63 |
| Rockwell hardness (M-scale) | Hr (M) 85~90 (20° C., 60%) |
| Moisture absorption | 5~6% (after 24 hours immersion in water of 25° C.) |
| Bending strength | 5~7 kg/mm$^2$ |
| Bending elasticity | 600~800 kg/mm$^2$ |
| Heat conductivity | 0.35 Kcal/m.hr.°C. |
| Static coefficient of friction | dry state 0.2~0.25 |
| | wet state 0.75~0.80 (23° C., 35%) (deer skin was used) |
| Compressive strength | 40~50 kg/mm$^2$ |

For comparison, a like shaped block with the composition of Table 4 but excluding silicon oxide was prepared in the same way and its properties were measured as shown below.

| | |
|---|---|
| Specific gravity | 1.63 |

-continued

| | |
|---|---|
| Rockwell hardness | Hr (M) 85~90 (20° C., 60%) |
| | Hr (M) 15 (after immersion in water of 25° C.) |
| Bending strength | 7~8 kg/mm$^2$ |
| Bending elasticity | 500~640 kg/mm$^2$ |
| Heat conductivity | 0.35 Kcal/m.hr.°C. |
| Static coefficient of friction | dry state 0.2~0.25 |
| | wet state 0.75~0.80 |
| | (23° C., 35%) |
| | (deer skin was used) |
| Compressive strength | 19~30 kg/mm$^2$ |
| Tensile strength | 8 kg/mm$^2$ |

These data clearly indicate that addition of non-hydrated inorganic filler, i.e. silicon oxide, assures significant improvement in properties of the product.

Example 4

As shown in Table 5, a wide variety of non-hydrated inorganic fillers were separately added to casein and obtained mixtures were processed just as in Example 3. Properties of the products were measured also in the same way and are shown in Table 6.

TABLE 5

| Sample No. | Filler | Chemical composition | Parts per 100 parts of casein |
|---|---|---|---|
| 7 | Silicon oxide | SiO$_2$ | 75 |
| 8 | Calcium phosphate | Ca$_3$(PO$_4$)$_2$ | 50 |
| 9 | Alumina | Al$_2$O$_3$ | 75 |
| 10 | Calcium carbonate | CaCO$_3$ | 75 |
| 11 | Barium Carbonate | BaCO$_3$ | 75 |
| 12 | Barium sulfate | BaSO$_4$ | 50 |
| 13 | Calcium sulfate | CaSO$_4$ | 50 |
| 14 | Magnesium oxide | MgO | 75 |
| 15 | Titanium oxide | TiO$_2$ | 75 |

TABLE 6

| Sample No. | Specific gravity | Hardness Hr(M) | Moisture absorption % | Heat conductivity Kcal/m.hr.°C. | Static coefficient of friction | |
|---|---|---|---|---|---|---|
| | | | | | dry | wet |
| 7 | 1.63 | 85~90 | 5~6 | 0.35 | 0.20~0.25 | 0.75~0.80 |
| 8 | 1.66 | 70~75 | 7~8 | 0.30 | " | 0.80~0.85 |
| 9 | 1.85 | 85~95 | 5~6 | 0.40 | " | " |
| 10 | 1.71 | 75~80 | 5~6 | 0.35 | " | " |
| 11 | 1.91 | 75~80 | 5~6 | 0.30 | " | 0.75~0.80 |
| 12 | 1.75 | 70~75 | 6~7 | 0.30 | " | 0.65~0.70 |
| 13 | 1.64 | 70~75 | 7~8 | 0.30 | " | 0.80~0.85 |
| 14 | 1.81 | 75~80 | 5~6 | 0.35 | " | 0.75~0.80 |
| 15 | 1.90 | 80~90 | 5~6 | 0.40 | " | 0.80~0.85 |

These data clearly indicate that addition of any kinds of non-hydrated inorganic fillers almost equally assures significant improvement in properties of the product.

I claim:

1. An ivorylike composition plate for covering a wooden base comprising casein resin matrix hardened with formaldehyde and from about 14.3 to about 47.0% by weight of hydrated inorganic filler selected from the group consisting of alumina hydrate, basic magnesium carbonate, hydrated aluminum silicate, magnesium silicate, hydrated silicic acid, calcium sulfate hydrate and hydrated calcium silicate, dispersed in said casein resin matrix.

2. An ivorylike composition plate as claimed in claim 1 in which said formaldehyde is provided in the form of formalin.

3. An ivorylike composition plate as claimed in claim 1 further comprising one of pigments and acid dyes.

4. A method for producing an ivorylike composition plate for covering a wooden base comprising the steps of mixing and kneading casein and hydrated inorganic filler selected from the group consisting of alumina hydrate, basic magnesium carbonate, hydrated aluminum silicate, magnesium silicate, hydrated silicic acid, calcium sulfate hydrate and hydrated calcium silicate with water to form a mixture; shaping said mixture to form a shaped plate; and impregnating said shaped plate with formaldehyde to harden said casein, said hydrated inorganic filler being present in said mixture in an amount sufficient to provide an ivorylike composition plate including from about 14.3% to about 47.0% by weight of said hydrated inorganic filler.

5. A method as claimed in claim 4 in which said formaldehyde is provided in the form of formalin.

6. Method as claimed in claim 4 in which 25 to 75 parts by weight of hydrated inorganic filler is mixed with 100 parts by weight of casein.

7. Method as claimed in claim 4 in which 1 to 10 parts by weight of pigment is further added to 100 parts by weight of casein.

8. Method as claimed in claim 4 in which 1 to 10 parts by weight of acid dye is further added to 100 parts by weight of casein.

9. Method as claimed in claim 4 in which 1 to 50 parts by weight of non-hydrated inorganic filler is further added to 100 parts by weight of casein.

10. Method as claimed in claim 9 in which 5 to 20 parts by weight of non-hydrated inorganic filler is further added to 100 parts by weight of casein.

11. Method as claimed in claim 9 in which said non-hydrated inorganic filler is chosen from a group consisting of calcium phosphate, silicon dioxide, alumina, calcium carbonate and barium sulfate.

* * * * *

UNITED STATES PATENT AND TRADEMARK OFFICE
CERTIFICATE OF CORRECTION

PATENT NO. : 4,447,268
DATED : May 8, 1984
INVENTOR(S) : Yutaka Oshima

It is certified that error appears in the above-identified patent and that said Letters Patent are hereby corrected as shown below:

Column 4, line 25, "whitness" should read -- whiteness -- .

Column 5, line 31, "shaped block" should read -- shaped composition plate -- .

Column 5, line 36, "1.34" should read -- 1.58 -- .

Column 6, line 67, "1.63" should read -- 1.34 -- .

Column 7, line 7, "0.35" should read -- 0.18 -- .

Signed and Sealed this

Eleventh Day of December 1984

[SEAL]

Attest:

GERALD J. MOSSINGHOFF

Attesting Officer    Commissioner of Patents and Trademarks

UNITED STATES PATENT AND TRADEMARK OFFICE
CERTIFICATE OF CORRECTION

PATENT NO. : 4,447,268

DATED : May 8, 1984

INVENTOR(S) : Yutaka Oshima

It is certified that error appears in the above-identified patent and that said Letters Patent is hereby corrected as shown below:

Column 5, line 9, "1.34" should read -- 1.58 --.

Column 5, line 36, "1.58" should read -- 1.34 --.

Signed and Sealed this

Sixth Day of August 1985

[SEAL]

Attest:

DONALD J. QUIGG

Attesting Officer

Acting Commissioner of Patents and Trademarks